April 22, 1941.　　　C. L. EKSERGIAN　　　2,239,086
RAILWAY BRAKE
Filed Nov. 8, 1939　　　3 Sheets-Sheet 1

INVENTOR
Carolus L. Eksergian
BY John P. Dunlop
ATTORNEY

April 22, 1941.  C. L. EKSERGIAN  2,239,086
RAILWAY BRAKE
Filed Nov. 8, 1939  3 Sheets-Sheet 2
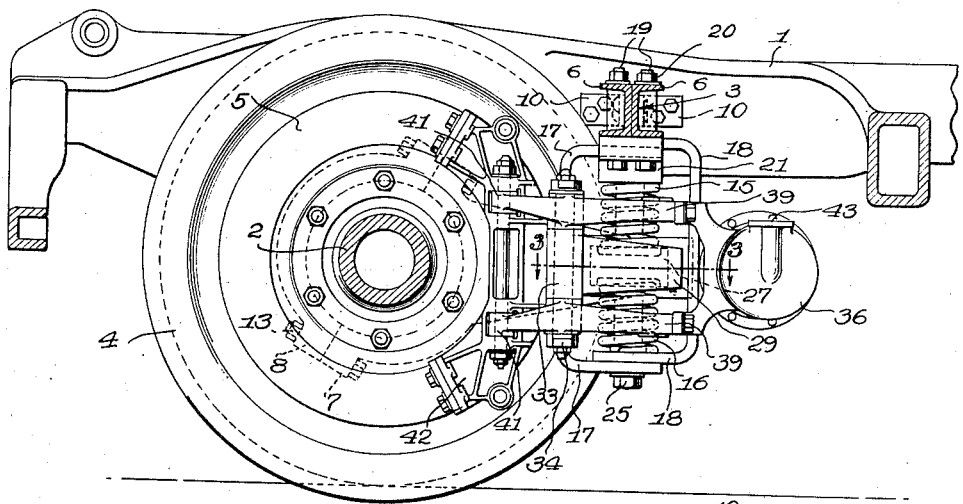
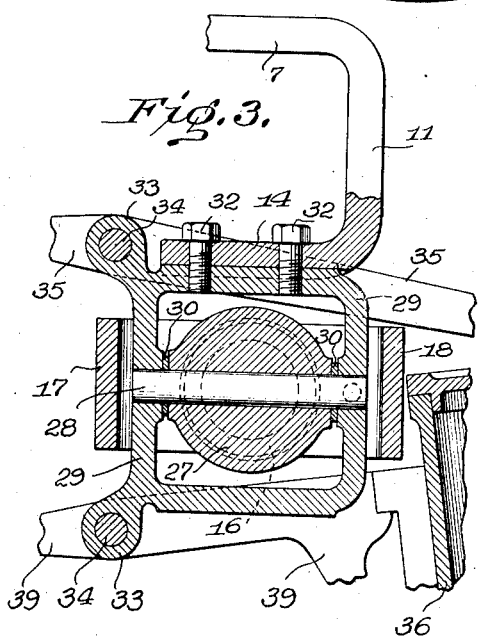
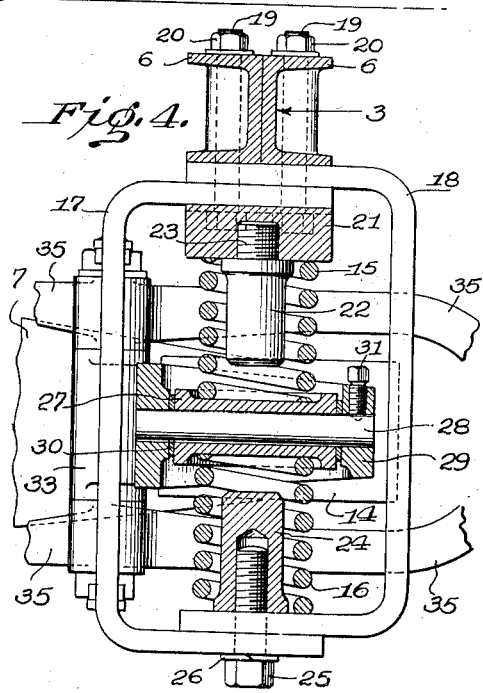
INVENTOR
Carolus L. Eksergian
BY
ATTORNEY April 22, 1941.  C. L. EKSERGIAN  2,239,086

RAILWAY BRAKE

Filed Nov. 8, 1939  3 Sheets-Sheet 3

INVENTOR
*Carolus L. Eksergian*
BY *John P. Bishop*
ATTORNEY

Patented Apr. 22, 1941

2,239,086

UNITED STATES PATENT OFFICE 2,239,086

RAILWAY BRAKE

Carolus L. Ekserglan, Detroit, Mich., assignor to Budd Wheel Company, Philadelphia, Pa., a corporation of Pennsylvania Application November 8, 1939, Serial No. 303,353

11 Claims. (Cl. 188—153)

The present invention relates to brakes.

More particularly, it concerns brakes of the disk type, wherein the braking is provided by disks rotating with the wheels and having co-operating relatively stationary brake shoes, coacting with the side faces of the disks to provide the braking effort.

A specific object of the present invention is to provide completely independent braking mechanisms, usually two being provided for each axle, that is, one for each wheel.

In the brake mechanism disclosed in the copending application Serial No. 270,750 filed April 29, 1939, there is embodied a pair of brake mechanisms which are interconnected by a yoke for joint movement with respect to the truck frame and the present invention distinguishes therefrom in thus making the braking units independent of one another and decreasing the unsprung weight.

A further object of the present invention is to dispose the braking elements in such way that the tendency of the brake shoe assemblies to twist, with respect to the radial direction of the disk is practically completely eliminated, this being accomplished by so designing the braking mechanism that the resultant reaction of the braking effort acts in a plane substantially central of the thickness of the disk and at a point as close as practicable to the periphery of said disk, whereby a nearly balanced condition results and the tendency to twist is practically eliminated.

A preferred embodiment of the invention, and also a slightly modified form thereof, are disclosed in the present specification and the drawings accompanying the same and forming a part thereof.

In the said drawings:

Fig. 2 is an elevation, partly in section on the plane indicated by the line 2—2 of Fig. 1;

Fig. 3 is a fragmentary detail on an enlarged scale, certain parts being shown in horizontal section on the plane indicated by the line 3—3 of Fig. 2;

Fig. 4 is a fragmentary detail on an enlarged scale, with certain parts shown in section along the vertical plane indicated by the line 4—4 of Fig. 1;

In all the figures, corresponding parts are indicated by similar reference characters.

Figure 1:
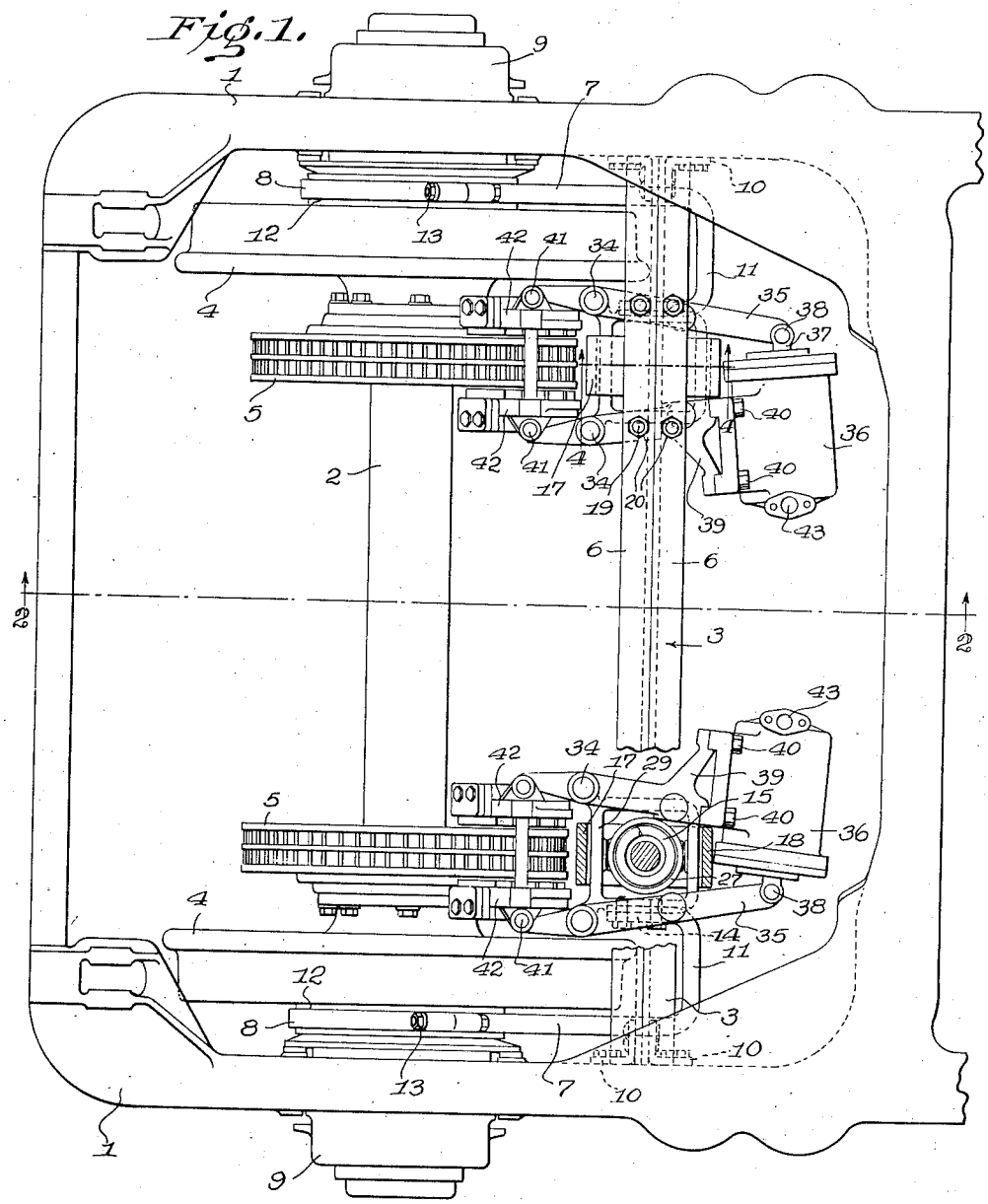
Fig. 1 is a diagrammatic plan view of a truck frame partly broken away, showing an axle and wheels with a pair of brake mechanisms applied thereto.

Referring first to the structure disclosed in Figs. 1 to 4, the truck frame as a whole, which is spring supported in a usual manner (not shown) is indicated by reference character 1, and carries the journal boxes 9 in which are guided the ends of the axle 2, which carries the wheels 4 and the brake disks 5, it being understood that said brake disks may be carried directly by the axle 2 if the wheels 4 are rigidly connected to said axle or may be carried directly by the wheels 4 in case said wheels are rotatable about said axle, since the operation and structure of the brake mechanism are independent of whether the axle is live or dead.

A support 3, which may be built of two channel members 6, arranged web to web, as indicated in Fig. 2, may be secured to opposite sides of the frame 1 in any desired manner, angle members 10 being here shown for the purpose. This support 3 serves to mount the brake cylinders and the linkages and shoes operated thereby, in proper relation to the brake disks 5.

Each journal box 9 may have a groove cut circumferentially therein, adjacent the outside face of the wheel, as indicated at 12 and in said grooves are located the outer ends of guide arms 7, one end of each of which is semi-circular as indicated in dotted lines in Fig. 2, and said end is secured in its groove by the cooperating semi-circular strap 8, these parts being removably secured to one another in any customary way, as by bolts and nuts 13.

Each arm 7 extends radially away from the axle 2 for a certain distance, and is then bent inwardly substantially at right angles, as shown at 11, and then again bent back toward the axle as shown at 14 in Fig. 3, to provide means for attaching certain parts thereto. It may be well here to point out however, that the chief function of the arms 7 is to guide rather than to support the parts which are attached thereto, the braking mechanism being so designed and located that the resultant reaction of the braking effort is in the central plane of the cooperating brake disk and very close to its periphery so that the twisting couple is practically eliminated and the arm 7 need merely hold the linkage mechanisms properly centered and spaced with respect to the brake disk. It can therefore be made of relatively light construction.

By reason of the fact that arm 7 can pivot about the axis of the journal box 9, it will thus provide a similar possibility of pivotal motion of the brake mechanism about the axis of axle 2. In order to limit such pivotal motion, to the desired degree and to absorb the road shocks, resilient means are provided, here illustrated as a spring 15 above the arm, and a similar spring 16 below it, as best shown in Fig. 4.

These springs are housed within a rectangular or O-shaped yoke, made preferably of two similar U-shaped members 17 and 18, connected to one another as shown in Figs. 2 and 4, and attached to the cross member 3 by means of the bolts 19 and nuts 20, passing through a securing block 21 and upper overlapping portions of the members 17 and 18. A guide and retaining member 22 for the spring 15 may be held by the block 21 in any desired way, as by the screw-threaded stem 23. A similar guide and retaining member 24 for the spring 16 may conveniently be arranged, as shown, to cooperate with the cap screw 25 and lock washer 26 to hold the lower ends of the U-shaped yoke members together, the member 24 being internally threaded as shown, to receive the threaded end of the cap screw 25 and act as a nut for the same.

The inner ends of the springs 15 and 16 bear against a disk 27, which is preferably cupped on both faces to assist in keeping the springs in place and said disk 27 is mounted pivotally on a pin 28 extending therethrough and mounted in a substantially square frame 29, with spacing washers 30 interposed between it and the disk. The pin 28 may be secured firmly in the frame or yoke 29 in any desired way, as by the set screw 31 shown in Fig. 4. It is thus possible for the frame or yoke 29 to pivot slightly with respect to the yoke 17, 18, which is secured rigidly to the cross member 3, thus avoiding strains from being set up when the frame 1 twists slightly in service.

The frame or yoke 29 may be secured to the guide arm 7 in any suitable way, for example, by means of the cap screws 32, shown in Fig. 3. The yoke 29 has lugs 33 formed thereon, as shown, and these lugs serve to support the brake-operating levers, which are pivotally secured to said lugs by means of pins or bolts 34, which extend vertically. A brake cylinder 36 has a rod 37 pivoted to its piston, said rod being pivotally connected at 38 to one end of a lever 35, while a corresponding lever 39 is secured rigidly to the cylinder 36, as by the cap screws 40, so that lever 39 will move together with cylinder 36 about its pivot 34, whenever relative motion exists between said cylinder and the piston mounted therein.

The result will be that the short arms of the levers 35 and 39 which extend from the pivots 34 toward the axle 2 will approach one another. Since these short ends of the levers are pivotally attached at 41 to the respective brake shoes 42, actuation of the pistons and cylinders will result in forcing said brake shoes against opposite faces of the disk 5, so as to provide the desired braking effort. Since one of the brake shoes operated by the piston, and the other by the cylinder, it is obvious that they will be pressed with equal force against the respective sides of the disk, so that the braking energy is applied equally to the two faces of the disk.

It will be understood that the pressure medium for actuating the brakes may be admitted to the cylinders 36 in any preferred way, as by a suitable flexible air pipe connected to port 43. The levers 35 and 39 are bifurcated at both ends as shown, to increase their stability and to clear the intervening mechanism, this feature being embodied in former applications and shown, for example, in the copending application hereinabove referred to.

Figure 5:
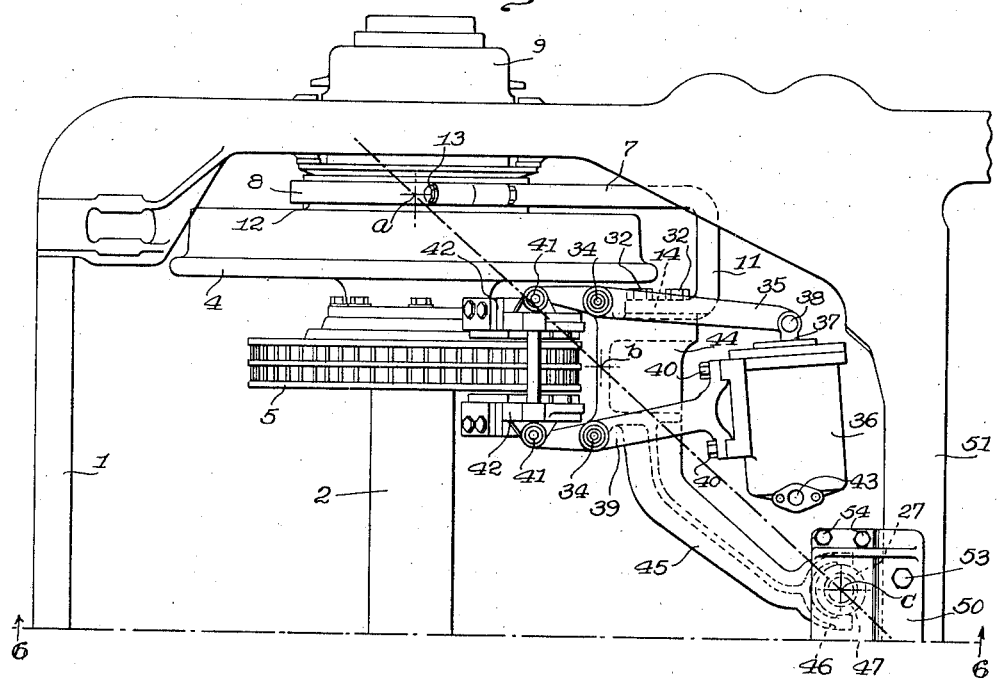
Fig. 5 is a fragmentary plan view of a part of a truck frame, showing a modified form of braking mechanism.
Figure 6:
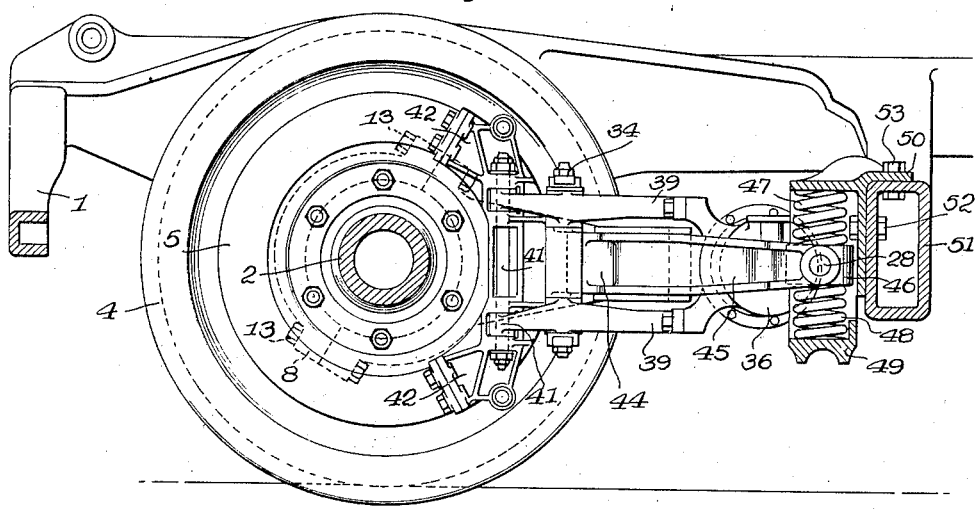
Fig. 6 is a corresponding elevation, parts thereof being shown in section along the central longitudinal plane indicated by the line 6—6 of Fig. 5.

Referring now to the slightly modified form illustrated in Figs. 5 and 6, many of the parts are identical with those already described and therefore are indicated by similar reference characters. The axle 2, upon which are mounted the wheel 4 and the brake disk 5, is mounted in the journal box 9 carried in the pedestals in the frame 1. A groove 12 formed in the inner end of the journal box 9, adjacent the wheel 4, serves to hold the semi-circular concave end of the arm 7 by means of the semi-circular strap 8 which is held thereto by the bolts and nuts indicated at 13.

This arm 7 is bent substantially at right angles in an inward direction, as at 11 and thereupon is bent again parallel to its original direction but pointing back toward the axle 2, as indicated at 14. The arm 7 is thus mounted pivotally about the axis of the axle 2. As in the previously described form, this arm serves to hold the brake mechanism in the properly alined and centered position with respect to the brake disk but must in this case also carry part of the torque load. By suitably designing the parts and by reason of the arrangement of the point $b$ substantially in line with the resultant tangential drag of the shoes and in line with the spaced supports $a$ and $c$, it becomes possible to minimize the stresses carried by the support formed by the arm 7, frame 44 and arm 45, so that it need not be excessively strong. This will be explained in greater detail hereinafter.

The brake shoe operating mechanism comprises a brake cylinder 36 with a bifurcated lever 39 attached thereto and a cooperating bifurcated lever 35 pivotally attached at 38 to a rod 37 which is pivoted to the piston within said cylinder. These two levers are mounted upon pivots or pins 34 carried by a frame 44, which is secured in any suitable way, as by the cap screws 32, to the inner end 14 of the arm 7, which permits it to pivot about the axis of the axle 2. In order to limit the extent of such pivotal motion, an angularly bent arm 45, which is integral with the frame 44 or rigidly secured thereto, is provided, said arm terminating in a fork 46, here shown as substantially semi-circular.

This fork has the disk 27 mounted therein, said disk being in all respects like that shown in Fig. 3. A spring 47 bears against its upper cupped surface and a corresponding spring 48 acts on its lower cupped surface, both said springs being housed with an open casing 49, as best shown in Fig. 6. The casing 49 may have a flange 50 thereon and may be secured to the cross member 51 of the frame 1, by any suitable means such as bolts 52 and 53, as shown.

It will be noted that in this form the cross member 51 of the truck frame 1 itself serves to support the brake mechanism, thus making it unnecessary to provide the double channel support 3 of the previously described form. The casing 49 preferably has its lower half separable from its upper half along a horizontal junction, the two parts of the casing being held together by the bolts 54, in order to make it easy to obtain access to the interior thereof to insert or remove the springs and the fork 46 at the end of the arm 45, for inspection, repair, or replacement.

Since the disk 27 is pivoted to the fork 46 by means of the pin 28, and is held resiliently in the casing by the springs 47 and 48, this makes it possible for the said fork to move up and down slightly in service, the springs cushioning the road shocks and transmitting the torque to the truck frame, and prevents any binding stresses from being set up by the twisting of the truck frame 1 due to unevennesses of the roadbed or other causes.

In Fig. 5 there is shown a dot-and-dash line passing through the three points a, b, and c. This line indicates that the center c of the disk 27 and the center a of the ring, formed by the strap 8 and the adjacent end of the arm 7, are in line with the point b, which is the point of application of the resultant reaction or resultant tangential drag produced when the brake shoes 42 are forced against the faces of the disk 5. This shows that the said reaction or drag will have practically no component twisting moment acting through the points of support a and c. Therefore the arm 7 may be comparatively lighter and may serve primarily to properly aline and center the brake mechanism, as previously stated.

It will be understood that in the modified form shown in Figs. 5 and 6 there will be a complete brake operating mechanism for each disk, just as in the preceding form, and that in general the difference between the two forms is that the second form is somewhat simpler than the first, and is a little more readily removable from the truck frame.

The operation of the mechanisms described herein will be practically self-obvious from the structures and may be briefly summarized as follows:

Referring first to the form disclosed in the Figs. 1 to 4, when pressure medium is applied to the brake cylinder 36, the piston will be forced out of the said cylinder, thus moving the long arm of the lever 35 outwardly, while at the same time the equal pressure exerted in the opposite direction by the cylinder itself, will cause the long arm of the lever 39 to move inwardly. Since these two brake levers are pivoted to the yoke 29 at 34, the corresponding short inner arms of the levers will cause the brake shoes 42 to engage the opposite faces of the brake disk 5 with equal intensities, and greater than the forces exerted at the ends of the long arms of the levers. The springs 15 and 16 bearing against the disk 27 will allow the brake shoe applying mechanism as a whole to yield in a vertical direction, to take up any sudden shocks or the like.

The entire brake assembly, exclusive of the brake disk of course, may be removed readily by releasing the bolts 19, holding the yoke to the support 3 and releasing the bolts 13 which hold the strap 8 to the arm 7. In this way it becomes a relatively simple matter to remove a complete brake assembly and replace it by a duplicate without taking time to repair the original one, so that there may be no delay and lost time of the vehicles due to necessary brake adjustments or repairs. The brake assembly which has been removed may be taken to a shop, provided with proper facilities for reconditioning it in due course, that is, the present invention makes it unnecessary to make repairs or adjustments of the brake while it is on the road or attached to the vehicle. Since the brake mechanisms and their supports associated with each disc are independent units, the removal for repair or adjustment is facilitated.

By providing the proper location of the reaction of the braking forces, the stresses will be taken up practically entirely by the springs 15 and 16 and transmitted to the channel members 6, so that the guiding arm 7 may be made relatively light, as it is not subjected to any material stresses in service. The entire braking assembly is very compact and occupies only a relatively short horizontal space beneath the vehicle, where such space is necessarily at a premium.

The operation of the modified form disclosed in Figs. 5 and 6 is substantially the same as that of the other form just described, and this type has the same advantage of ease of insertion and removal, since it is necessary merely to remove the bolts 54 and 13, to separate the brake mechanism entirely from the wheel truck. In this form the arm 45 carrying the disk 27 at its end will carry substantially all the braking stresses, so that here again the arm 7 may be made relatively light, since it exercises only a guiding or centering function.

While two definite forms have been disclosed herein, it should be understood that these are merely illustrative of the invention and not in any way a limitation thereof. An underlying principle of the invention is so to dispose the parts of the mechanism that the point of application of the reaction resulting when braking effort is being exerted will lie substantially in the central plane of the brake disk and close to its periphery, so that no appreciable twisting movement will be exerted upon the guide arm, and so that practically all the thrust produced on the brake assembly support will be transmitted to the special cross piece carried by the wheel truck for the purpose or to a cross piece already present in the truck, such as a transom or cross brace. It is obvious that this principle may be embodied in many other forms of brake mechanism, and therefore the scope of the invention is defined solely by the following claims.

I claim:

1. A brake mechanism comprising a truck frame, an axle carried thereby, a wheel mounted on the said axle, a brake ring attached to the said wheel, a brake shoe cooperating with the said ring, and means for actuating the said brake shoe, the said means including an arm mounted to pivot at a single point and at one side of said ring about the axis of the axle, a brake cylinder carried thereby, and a stop for limiting the rotation of the arm about its pivot, the said parts being so disposed that the straight line connecting the pivotal center with the stop passes closely adjacent the median plane of the periphery of the brake ring and substantially through the point through which the resultant tangential drag of the shoe acts.

2. A brake mechanism comprising a truck frame, an axle carried thereby, a wheel mounted on the said axle, a brake ring attached to the said wheel, a pair of brake shoes cooperating with the said ring, and located adjacent the opposite faces thereof, and means for actuating the said brake shoes, the said means including an arm mounted to pivot at a single point and at one side of said ring about the axis of the axle, a brake cylinder and piston pivotally carried thereby, means connecting one of the shoes with the cylinder and the other with the piston, and a stop for limiting the rotation of the arm about its pivot, the said stop being so disposed that the straight line connecting the pivotal center of the arm with the stop passes closely adjacent the median plane of the periphery of the brake ring and substantially through the point through which the resultant tangential drag of the shoes act.

3. A brake mechanism comprising a truck frame, an axle carried thereby, a wheel mounted on the said axle, a brake ring attached to the said wheel, a brake shoe cooperating with the said ring, and means for actuating the said brake shoe, the said means including an arm mounted to pivot at a single point and at one side of said ring about the axis of the axle, a brake cylinder, the said arm serving to guide the said brake shoe and the said brake cylinder, and a yieldable resilient stop for limiting the rotation of the arm about its pivot, so disposed that the straight line connecting the pivotal center with the stop passes closely adjacent the median plane of the periphery of the brake ring and substantially through the point through which the resultant tangential drag of the shoe acts.

4. A brake mechanism comprising a truck frame, an axle carried thereby, a wheel mounted on the said axle, a brake ring attached to the said wheel, a pair of brake shoes cooperating with the opposite faces of the said ring, and means for applying the said brake shoes thereagainst, the said means including an arm mounted to pivot at a single point and at one side of said ring about the axis of the axle, a brake cylinder and piston, the said arm serving to guide the said brake shoes and their applying means, and a yieldable resilient stop for limiting the rotation of the arm about its pivot, so disposed that the straight line connecting the pivotal center with the stop passes closely adjacent the median plane of the periphery of the brake ring and substantially through the point through which the resultant tangential drag of the shoes act.

5. A yieldable stop device for a vehicle brake mechanism, comprising a casing, means for securing it to a relatively stationary part of the vehicle, a pair of opposed resilient members in the said casing, means for preventing the said resilient members from becoming dislodged, a fitting interposed between the said resilient members and thus yieldably held thereby, and means pivotally connecting the said fitting and a torque arm of the brake mechanism, to control the position of the said arm, but permit the fitting to maintain its alignment with said resilient members.

6. A stop for yieldably holding the free end of a brake arm to limit the movement thereof, said stop comprising a yoke encircling the end of said arm, means for supporting said yoke, a pair of opposed resilient means within said yoke, an abutment member held by and between the inner ends of said opposed resilient means, and means pivotally connecting said abutment member with the end of the brake arm to maintain it in alignment with said springs.

7. A stop for a brake arm, comprising a yoke encircling the end of said arm, means for supporting said yoke, a pair of opposed helical springs mounted in said yoke, a disk between the inner ends of said springs, and means pivotally connecting the disk to turn on a diameter thereof in the end of the brake arm.

8. A brake unit comprising a disk carried by a rotating part, brake shoes cooperating with the faces of the disk, means for forcing said shoes thereagainst and a frame for carrying said means, said frame having a support at one side pivotally mounted about the axis of the disk, and a second support at the opposite side held substantially immovable at a stationary point relatively remote from said axis, the pivotal center being substantially as far to one side of the median plane of the disk as the said stationary point is to the other side thereof, whereby any tendency of the brake shoes to bind by turning about an axis in the said median plane is substantially eliminated.

9. A brake unit as defined in claim 8 wherein the line joining the pivotal center and the stationary point passes closely adjacent the median plane of the periphery of the disk.

10. A brake unit comprising an axle, a wheel mounted thereon, a brake disk rotating with said wheel and located inside said wheel, a pair of brake shoes, means for forcing them against the opposite faces of the disk, and a frame for supporting said means, said frame comprising an arm pivotally mounted around the axle outside of the wheel, and a second arm extending to the opposite side, and secured against undue movement.

11. In combination with a truck frame, a wheel and axle assembly supporting it, and a brake ring having braking faces on its opposite sides and mounted adjacent a wheel of said assembly to rotate therewith, a unitary brake mechanism comprising a pair of brake shoes, a brake cylinder and connections between the brake cylinder and shoes for actuating them and a support for carrying said brake shoes, cylinder and connections in proper positions to coact with the faces, said support being resiliently mounted on the truck frame adjacent the periphery of the ring, and a supporting and guiding arm fixed to said support and extending around said wheel and mounted to pivot about the axis of the wheel on the side thereof opposite said ring.

CAROLUS L. EKSERGIAN.